US005095543A

United States Patent [19]
Dejmek

[11] Patent Number: 5,095,543
[45] Date of Patent: Mar. 10, 1992

[54] METHOD AND DEVICE FOR AUDIO WAVEFORM CORRECTION IN A RF COMMUNICATION SYSTEM POSTDETECTION CIRCUIT

[75] Inventor: James W. Dejmek, Lombard, Ill.

[73] Assignee: Motorola, Inc., Schaumburg, Ill.

[21] Appl. No.: 619,358

[22] Filed: Nov. 28, 1990

[51] Int. Cl.⁵ .............................................. H04B 7/08
[52] U.S. Cl. ................................. 455/136; 455/137; 455/273
[58] Field of Search ............... 455/52, 133–138, 455/273, 234; 381/80, 81, 107; 330/295, 124 R, 132, 200

[56] References Cited

U.S. PATENT DOCUMENTS

| | | | |
|---|---|---|---|
| 4,210,871 | 7/1980 | Hill et al. | 455/273 |
| 4,261,056 | 4/1981 | Barnett et al. | 455/273 |
| 4,355,419 | 10/1982 | Hiyama | 455/137 |
| 4,373,207 | 2/1983 | Hecken | 455/273 |
| 4,602,169 | 7/1986 | Shimizu | 455/134 |

Primary Examiner—Curtis Kuntz
Attorney, Agent, or Firm—Darleen J. Stockley

[57] ABSTRACT

A method and device are set forth for providing an improved audio waveform correction in a postdetection circuit in a radio frequency communication system. A device is described that utilizes at least two voltage-controlled resistors, at least three operational amplifiers, and selected resistors, as desired, to adjust amplification, as desired, of at least a first received audio signal with respect to at least a first input control voltage to obtain an adjusted first received audio signal, and combines the adjusted first received audio signal with an at least first voltage-selected waveform to provide an at least first corrected audio signal.

15 Claims, 2 Drawing Sheets

METHOD AND DEVICE FOR AUDIO WAVEFORM CORRECTION IN A RF COMMUNICATION SYSTEM POSTDETECTION CIRCUIT

FIELD OF THE INVENTION

This invention relates in general to communication system reception, and more particularly to diversity reception in communication systems.

BACKGROUND OF THE INVENTION

Radio reception of audio signals has typically been subject to imperfections due to fading and variations in received signal strengths. In the past, amplifier circuits were often combined with at least bandpass filters and envelope detectors, frequently in diversity systems, to provide postdetection combining circuits for improving the quality of received radio signals. However, there is a need for less complex circuits for improving radio signal reception.

SUMMARY OF THE INVENTION

The present invention sets forth a method and system for substantially providing audio waveform correction in at least a first postdetection system in a radio frequency (RF) communication system, having at least a first received audio signal and at least a first input control voltage, comprising at least: first voltage-controlled resistor means, coupled to an at least first voltage-selectable amplifying means and the at least first input control voltage, for adjusting a gain of a first voltage-selectable, where desired, amplifying means; the first voltage-selectable, where desired, amplifying means, coupled to the first-voltage controlled resistor means and operably linked to the at least first received audio signal, for adjusting the at least first received audio signal in view of the first input control voltage to provide at least a first adjusted audio signal; second voltage-selectable, where desired, amplifying means, coupled to the at least first input control voltage, for adjusting an at least first selected voltage in view of the at least first input control voltage to provide at least an adjusted first voltage-selected waveform; second voltage-controlled resistor means, coupled to the at least second amplifying means and the input control voltage, for adjusting a gain of the second voltage-selectable, where desired, amplifying means; and first combining means, coupled to the first voltage-selectable, where desired, amplifying means and the second voltage-selectable, where desired, amplifying means, for amplifying, if desired, and combining the at least first adjusted audio signal and the at least adjusted first voltage-selected waveform to provide at least a first corrected audio signal such that the at least first adjusted audio signal is substantially corrected for the at least adjusted first voltage-selected waveform.

DETAILED DESCRIPTION OF A PREFERRED EMBODIMENT

Figure 1:
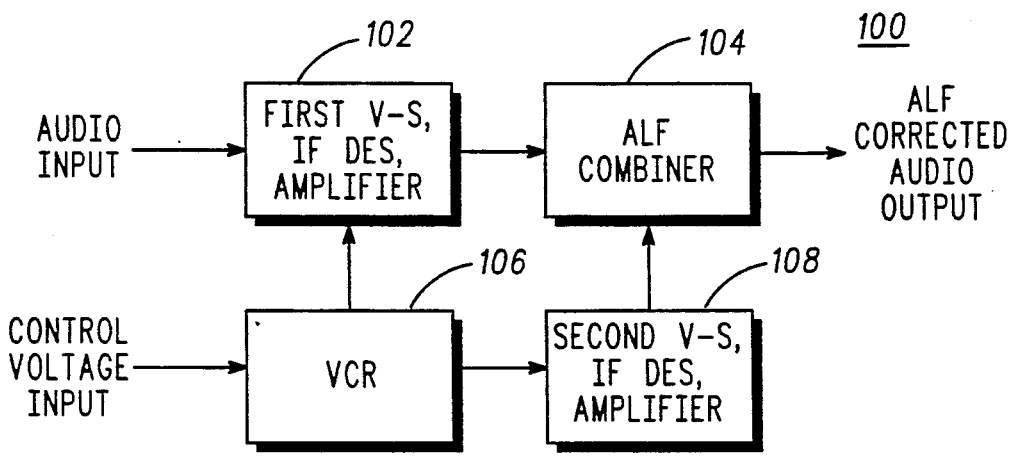
FIG. 1 is a block diagram illustrating an embodiment of an improved audio waveform correction system according to the present invention.

FIG. 1, numeral 100, illustrated one embodiment of an improved audio waveform correction system according to the present invention wherein there is at least a first audio signal input and at least a first input control voltage. Where a postdetection system in a RF communication system according to the present invention receives at least a first audio signal input and at least a first input control voltage, the postdetection system includes at least a first voltage-controlled resistor means (VCR)(106), typically comprising at least a first and a second voltage-controlled resistor, each at least first and second voltage-controlled resistor comprising at least a first complementary metal oxide silicon oxide transistor, each voltage-controlled resistor adjusting a gain, respectively, of each at least first and second voltage-selectable, if desired, amplifying means (FIRST V-S, IF DES, AMPLIFIER; SECOND V-S, IF DES, AMPLIFIER)(102, 108) coupled thereto. The gain substantially changes dynamically with respect to the input control voltage.

At least a first voltage-selectable, if desired, amplifier (102), for example, being coupled to at least the first voltage-controlled resistor, is further responsively coupled to the at least first audio signal input such that a first adjusted audio signal is provided to at least a first combiner (104), typically at least a first adjustable operational amplifier. Also, the at least second voltage-selectable, if desired, amplifier (108) is adjusted by at least the second voltage-controlled resistor in view of the at least first input control voltage to provide at least an adjusted first voltage-selected waveform to the at least first combiner (104). The at least first combiner (104) typically utilizes at least a first adjustable operational amplifier for amplifying, if desired, and combining the at least first adjusted audio signal and the at least adjusted first voltage-selected waveform to provide at least a first corrected audio signal, being a corrected audio output, such that the at least first adjusted audio signal is substantially corrected for the at least adjusted first voltage-selected waveform. Generally, at least a first resistor is selected for desired adjustment of each operational amplifier.

The above-described system may be embodied in a radio in a communication system, and also in a radio in a postdetection diversity reception communication system.

Figure 2A:
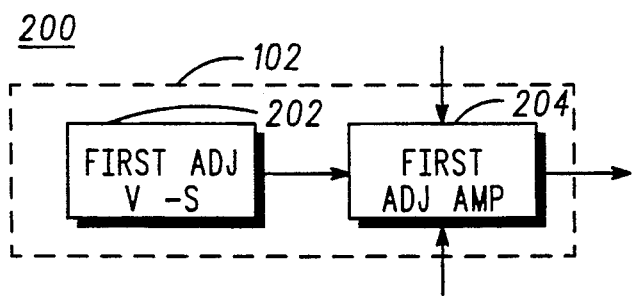
FIG. 2A and 2B are block diagrams further illustrating selective portions of the present invention as shown in FIG. 1.
Figure 2B:
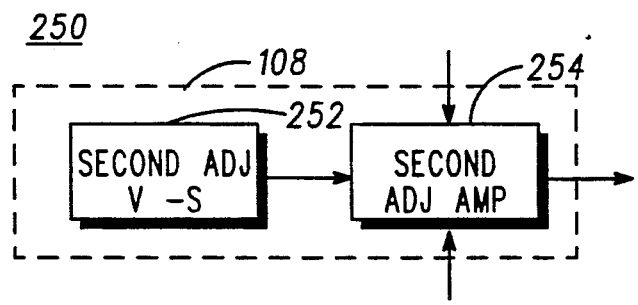

FIG. 2A and 2B, numerals 200 and 250, are block diagrams further illustrating, respectively, the at least first and second voltage-selectable, if desired, amplifiers of the present invention as shown in FIG. 1. Each V-S, IF DES, AMPLIFIER comprises at least an adjustable voltage-selector (ADJ V-S)(202, 252), typically having at least a first preselectable voltage and at least an adjustable amplifier (FIRST ADJ AMP, SECOND ADJ AMP), typically an adjustable operational amplifier (204, 254).

Figure 3:
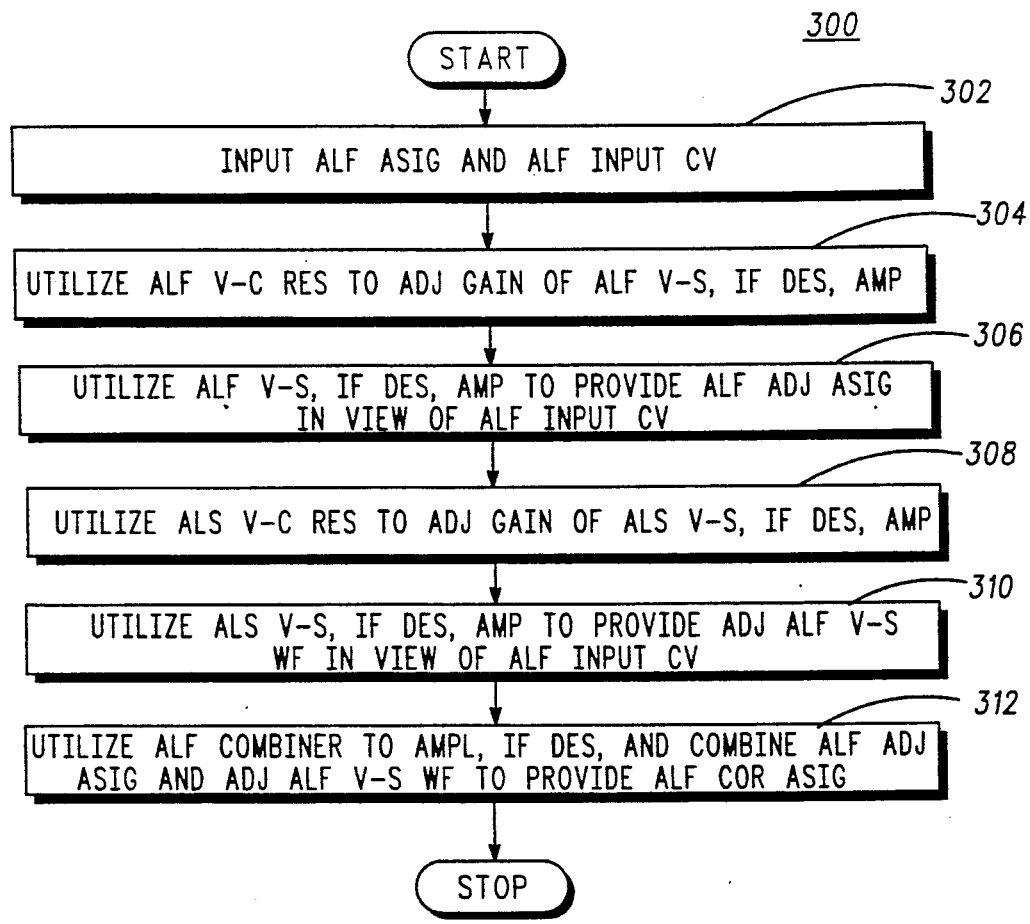
FIG. 3 is a flow chart setting forth the steps of the method of the present invention.

FIG. 3, numeral 300, is a flow chart setting forth the steps of the method of the present invention for providing audio waveform correction in at least a first postdetection system in a communication system having at least a first received audio signal and at least a first input control voltage. The method comprises at least the steps of: inputting at least a first audio signal (ALF ASIG)

and at least a first input control voltage (ALF INPUT CV)(302); utilizing at least a first voltage-controlled resistor (ALF V-C RES), coupled to an at least first voltage-selectable, where desired, amplifier (ALF V-S, IF DES, AMP) and responsive to the at least first input control voltage, for adjusting a gain of the at least first voltage-selectable, where desired, amplifier (304); utilizing the at least first voltage-selectable, where desired, amplifier, coupled to the first-voltage controlled resistor, for adjusting the at least first received audio signal in view of the first input control voltage to provide at least a first adjusted audio signal (ALF ADJ ASIG)(306); utilizing at least a second voltage-controlled resistor (ALS V-C RES), coupled to an at least second voltage-selectable, where desired, amplifier (ALS V-S, IF DES, AMP) and responsive to the input control voltage, for adjusting a gain of the second voltage-selectable, where desired, amplifier (308); utilizing the at least second voltage-selectable, where desired, amplifier, responsive to the at least first input control voltage, for adjusting an at least first selected voltage in view of the at least first input control voltage to provide an adjusted at least first voltage-selected waveform (ADJ ALF V-S WF)(310); and utilizing at least a first combiner, responsive to the first voltage-selectable, where desired, amplifier and the at least second voltage-selectable, where desired, amplifier, for amplifying, if desired, (AMPL,IF DES) and combining the at least first adjusted audio signal and the adjusted at least first voltage-selected waveform to provide at least a first corrected audio signal (ALF COR ASIG) such that the at least first adjusted audio signal is substantially corrected for the adjusted at least first voltage-selected waveform (312). Clearly the steps may be utilized in different order, such as providing at least a first adjusted audio signal after providing at least an adjusted at least first voltage-selected waveform. Also, the at least first voltage-controlled resistor, the at least second voltage-controlled resistor, the at least first voltage-selectable, where desired, amplifier, the at least second amplifier, and the at least first combiner may be implemented as above-described.

Figure 4:
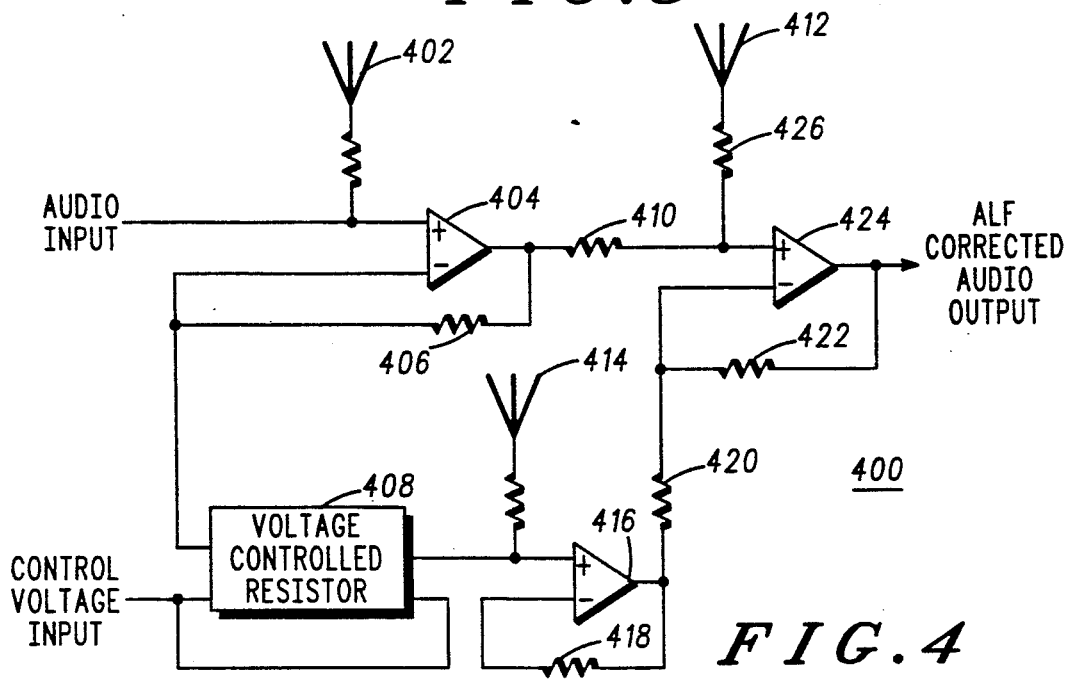
FIG. 4 is a simplified schematic diagram illustrating one exemplary embodiment of an improved audio signal reception correction circuit according to the present invention.

FIG. 4 is a simplified schematic diagram illustrating one exemplary embodiment of an improved audio signal reception correction circuit according to the present invention. Upon at least a first audio input and at least a first control voltage input into the exemplary circuit embodying the present invention, at least a first predetermined voltage (402) is utilized to set a first drain voltage value on at least a first voltage-controlled resistor in the VCR (408), typically as low as may be determined by a linear portion of available data on a family of gate source curves for a typical drain source voltage to drain current curve. The VCR typically comprises at least a first voltage-controlled resistor and at least a second voltage-controlled resistor, each comprising at least a first complementary metal oxide silicon oxide transistor. The at least first input audio signal is amplified with respect to control voltage by means of a first operational amplifier (404), typically having a first preselected resistor (406) along its feedback path. Additionally, the first drain voltage (402) is modified in correspondence with the at least first input control voltage. Similarly, a second predetermined voltage (414) is set such that it is substantially the same as the first predetermined voltage, and is utilized to set a second drain voltage value on at least the second voltage-controlled resistor in the VCR (408), in the same manner as above.

The second predetermined voltage (414) is amplified with respect to the at least first input control voltage by means of a second operational amplifier (416), typically having at least a second preselected resistor (418) along its feedback path and utilizing at least the second voltage-controlled resistor of the VCR (408). A third operational amplifier (424) is coupled to the first operational amplifier (404) by means of a resistor (410), if desired, and coupled to a third preselected voltage (412) where desired, by means of a resistor (426), if desired, and is also coupled to the second operational amplifier (416) by means of a resistor (420), if desired. The third operational amplifier (424) typically has at least a third preselected resistor (422). Clearly, the values of the resistors may vary as desired for a given implementation. Although an exemplary embodiment is described above, it will be obvious to those skilled in the art that many alterations and modifications may be made without departing from the invention. Accordingly, it is intended that all such alterations and modifications be included within the spirit and scope of the invention as defined by the appended claims.

The method and device of the present invention provide a compact, efficient and flexible system for audio signal reception correction, particularly in a diversity reception radio system.

I claim:

1. A system for substantially providing audio waveform correction in at least a first postdetection system in a radio frequency communication system, having at least a first received audio signal and at least a first input control voltage, comprising at least:
   A) first voltage-controlled resistor means, coupled to an at least first voltage-selectable amplifying means and the at least first input control voltage, for adjusting a gain of a first voltage-selectable amplifying means;
   B) the first voltage-selectable amplifying means, coupled to the first-voltage controlled resistor means and operably linked to the at least first received audio signal, for adjusting the at least first received audio signal in view of the first input control voltage to provide at least a first adjusted audio signal;
   C) second voltage-selectable amplifying means, coupled to the at least first input control voltage, for adjusting an at least first selected voltage in view of the at least first input control voltage to provide at least an adjusted first voltage-selected waveform;
   D) second voltage-controlled resistor means, coupled to the at least second amplifying means and the input control voltage, for adjusting a gain of the second voltage-selectable amplifying means; and
   E) first combining means, coupled to the first voltage-selectable amplifying means and the second voltage-selectable amplifying means, for amplifying, if desired, and combining the at least first adjusted audio signal and the at least adjusted first voltage-selected waveform to provide at least a first corrected audio signal such that the at least first adjusted audio signal is substantially corrected for the at least adjusted first voltage-selected waveform.

2. The system of claim 1, wherein the at least first voltage-controlled resistor means and the at least second voltage-controlled resistor means each comprise at least a first complementary metal oxide silicon oxide transistor.

3. The system of claim 1, wherein the at least first voltage-selectable where desired, amplifying means, the at least second amplifying means and the at least first combining means each comprise at least a first operational amplifier and, where desired, at least a first voltage-selectable resistor-divider.

4. The system of claim 1, wherein the at least first postdetection system is at least a first postdetection system in a diversity reception radio communication system.

5. A radio postdetection system for substantially improving audio waveform correction in at least a first postdetection system in a radio frequency communication system, having at least a first received audio signal and at least a first input control voltage, comprising at least:
A) first voltage-controlled resistor means, coupled to an at least first voltage-selectable amplifying means and the at least first input control voltage, for adjusting a gain of a first voltage-selectable amplifying means;
B) the first voltage-selectable amplifying means, coupled to the first-voltage controlled resistor means and operably linked to the at least first received audio signal, for adjusting the at least first received audio signal in view of the first input control voltage to provide at least a first adjusted audio signal;
C) second voltage-selectable amplifying means, coupled to the at least first input control voltage, for adjusting an at least first selected voltage in view of the at least first input control voltage to provide at least an adjusted first voltage-selected waveform;
D) second voltage-controlled resistor means, coupled to the at least second amplifying means and the input control voltage, for adjusting a gain of the second voltage-selectable amplifying means; and
E) first combining means, coupled to the first voltage-selectable amplifying means and the second voltage-selectable amplifying means, for amplifying, if desired, and combining the at least first adjusted audio signal and the at least adjusted first voltage-selected waveform to provide at least a first corrected audio signal such that the at least first adjusted audio signal is substantially corrected for the at least adjusted first voltage-selected waveform.

6. The system of claim 5, wherein the at least first voltage-controlled resistor means and the at least second voltage-controlled resistor means each comprise at least a first complementary metal oxide silicon oxide transistor.

7. The system of claim 5, wherein the at least first voltage-selectable, where desired, amplifying means, the at least second voltage-selectable, where desired, amplifying means and the at least first combining means each comprise at least a first selected operational amplifier and, where desired, at least a first voltage-selectable resistor-divider.

8. The system of claim 5, wherein the at least first postdetection system is at least a first postdetection system in a diversity reception radio communication system.

9. A radio postdetection system for substantially providing audio waveform correction in at least a first diversity reception radio frequency communication system, having at least a first received audio signal and at least a first input control voltage, comprising at least:
A) first voltage-controlled resistor means, coupled to an at least first voltage-selectable amplifying means and the at least first input control voltage, for adjusting a gain of a first voltage-selectable amplifying means;
B) the first voltage-selectable amplifying means, coupled to the first-voltage controlled resistor means and operably linked to the at least first received audio signal, for adjusting the at least first received audio signal in view of the first input control voltage to provide at least a first adjusted audio signal;
C) second voltage-selectable amplifying means, coupled to the at least first input control voltage, for adjusting an at least first selected voltage in view of the at least first input control voltage to provide at least an adjusted first voltage-selected waveform;
D) second voltage-controlled resistor means, coupled to the at least second amplifying means and the input control voltage, for adjusting a gain of the second voltage-selectable amplifying means; and
E) first combining means, coupled to the first voltage-selectable amplifying means and the second voltage-selectable amplifying means, for amplifying, if desired, and combining the at least first adjusted audio signal and the at least adjusted first voltage-selected waveform to provide at least a first corrected audio signal such that the at least first adjusted audio signal is substantially corrected for the at least adjusted first voltage-selected waveform.

10. The system of claim 9, wherein the at least first voltage-controlled resistor means and the at least second voltage-controlled resistor means each comprise at least a first complementary metal oxide silicon oxide transistor.

11. The system of claim 9, wherein the at least first voltage-selectable, where desired, amplifying means, the at least second voltage-selectable, where desired, amplifying means and the at least first combining means each comprise at least a first selected operational amplifier and, where desired, at least a first voltage-selectable resistor-divider.

12. A method of providing audio waveform correction in at least a first postdetection system in a radio frequency communication system having at least a first received audio signal and at least a first input control voltage, comprising at least the steps of:
A) utilizing at least a first voltage-controlled resistor, coupled to an at least first voltage-selectable amplifier and responsive to the at least first input control voltage, for adjusting a gain of a first voltage-selectable amplifier;
B) utilizing the at least first voltage-selectable amplifier, coupled to the first-voltage controlled resistor, for adjusting the at least first received audio signal in view of the first input control voltage to provide at least a first adjusted audio signal;
C) utilizing at least a second voltage-controlled resistor, coupled to a second voltage-selectable amplifier and responsive to the input control voltage, for adjusting a gain of the second voltage-selectable amplifier;
D) utilizing the at least second voltage-selectable amplifier, coupled to the at least first input control voltage, for adjusting an at least first selected voltage in view of the at least first input control voltage to provide an adjusted at least first voltage-selected waveform; and E) utilizing at least a first combiner, responsive to the first voltage-selectable amplifier and the at least second voltage-selectable amplifier, for amplifying, if desired, and combining the at least first adjusted audio signal and the adjusted at least first voltage-selected waveform to provide at least a first corrected audio signal such that the at least first adjusted audio signal is substantially corrected for the adjusted at least first voltage-selected waveform.

13. The method of claim 12, wherein the at least first voltage-controlled resistor and the at least second voltage-controlled resistor each comprise at least a first complementary metal oxide silicon oxide transistor.

14. The method of claim 12, wherein the at least first voltage-selectable, where desired, amplifier, the at least second voltage-selectable, where desired, amplifier, and the at least first combiner each comprise at least a first selected operational amplifier and, where desired, at least a first voltage-selectable resistor-divider.

15. The method of claim 12, wherein the at least first postdetection system is at least a first postdetection system in a diversity reception radio communication system.

* * * * *